(12) United States Patent
Kurtz et al.

(10) Patent No.: US 6,524,100 B2
(45) Date of Patent: Feb. 25, 2003

(54) FACILITY FOR THE THERMAL TREATMENT OF WORKPIECES

(75) Inventors: Rainer Kurtz, Wertheim (DE); Bernd Schenker, Boxberg (DE); Richard Kressmann, Zell (DE)

(73) Assignee: ERSA GmbH (DE)

( * ) Notice: Subject to any disclaimer, the term of this patent is extended or adjusted under 35 U.S.C. 154(b) by 0 days.

(21) Appl. No.: 09/893,722

(22) Filed: Jun. 28, 2001

(65) Prior Publication Data

US 2002/0001787 A1 Jan. 3, 2002

(30) Foreign Application Priority Data

Jun. 30, 2000 (DE) .......................................... 100 31 071

(51) Int. Cl.[7] ................................................. F27B 9/14
(52) U.S. Cl. ........................ 432/128; 432/122; 219/388; 219/395
(58) Field of Search ............................... 432/6, 13, 122, 432/125, 128, 130, 136, 143, 163, 239; 219/388, 395, 396

(56) References Cited

U.S. PATENT DOCUMENTS 3,790,336 A * 2/1974 Brede, III et al. .......... 432/128
6,164,961 A * 12/2000 Luscher et al. ............. 432/122
6,305,930 B1 * 10/2001 Fedak ........................ 432/125

FOREIGN PATENT DOCUMENTS

| DE | 42 01 475 A1 | 7/1993 |
| DE | 198 833 A 1 | 9/1996 |
| DE | 197 49 187 A1 | 5/1999 |
| JP | 07015133 A | 1/1995 |

* cited by examiner

Primary Examiner—Gregory Wilson
(74) Attorney, Agent, or Firm—McGlew and Tuttle, P.C.

(57) ABSTRACT

A facility for the thermal treatment of workpieces has a processing or heating chamber and at least one transport device, extending essentially completely through the processing or heating chamber, with which the workpieces to be treated can be transported through the processing or heating chamber. At least two processing or heating levels are hereby located on top of one another in the processing or heating chamber, with each processing or heating level having at least one separate transport device. This type of facility can preferably be used as a soldering facility, particularly a reflow soldering facility, or as a facility for the hardening or drying of plastics or adhesives.

17 Claims, 2 Drawing Sheets

FACILITY FOR THE THERMAL TREATMENT OF WORKPIECES

FIELD OF THE INVENTION

The invention concerns a facility for the thermal treatment of workpieces having a processing or heating chamber and at least one transport unit, extending essentially completely through the processing or heating chamber, with which the workpieces to be treated can be transported through the processing or heating chamber.

BACKGROUND OF THE INVENTION

Facilities of the type discussed are used, for example, as soldering facilities, particularly reflow soldering facilities, as facilities for the hardening of plastics or plastic parts, or as facilities for the drying or hardening of adhesives or adhesive bonds. In particular, facilities of the type discussed are used in order to solder workpieces, particularly printed circuit boards, mounted with electronic components with these components in an electrically conductive way. For this purpose, the printed circuit boards and/or the components are already provided with solder before being introduced into the soldering facility. In the soldering facility, a targeted melting of the solder occurs, due to the temperature control, combined, for example, with an appropriate selection of an inert gas atmosphere or similar means, in the processing and/or heating chamber, whereby an electrically conductive connection between the components and the printed circuit board is formed.

The known soldering facilities of this type have the particular disadvantage that the throughput, which essentially determines the productivity, through these known soldering facilities can primarily only be increased by raising the pass-through speed. However, this requires, on the one hand, that the pass-through path be extended—e. g., a doubled facility length for a doubled pass-through speed—and, on the other hand, for varying workloads of the facility, the process parameters, such as the pass-through speed and the temperature of the individual heating zones, must be continuously adjusted. This is uneconomical and leads, particularly for a high maximum throughput, to facilities with considerable lengths. In addition, due to the change of the process parameters, satisfactory soldering results cannot be guaranteed with the reliability required.

SUMMARY AND OBJECTS OF THE INVENTION

Proceeding from this prior art, it is the object of the present invention to create a facility of this type with which the throughput can be increased in an economical and reliable way.

The facility according to the invention has, in a way which is primarily known, a processing or heating chamber and at least one transport unit, extending essentially completely through the processing or heating chamber, with which the workpieces to be thermally treated, particularly to be soldered, such as printed circuit boards mounted with components, can be transported through the processing or heating chamber. The melting of the solder occurs in the processing or heating chamber, possibly under an inert gas atmosphere or similar means, as does, if necessary, the cooling of the soldered connections under defined temperature conditions to a specific predetermined value. According to the invention, at least two processing or heating levels are located one on top of the other in the processing or heating chamber, with each processing or heating level having at least one separate transport device for the workpieces.

In other words, this entails that the throughput through the facility can be increased according to the invention in that the workpieces can be transported through the facility and/or the processing or heating chamber in parallel to one another and essentially simultaneously. The proven process parameters such as pass-through speed and temperature distribution within the processing and heating chamber can thereby be kept, independent of the throughput, essentially constant without changing the length of the facility and, thereby, of the processing path; the increase in throughput occurs exclusively due to the parallel arrangement of practically as many processing or heating levels as desired, with, in addition, varying workloads also not leading to a significant change of these process parameters.

The temperature distribution and/or the distribution of the remaining process parameters in the direction of transport can be constant in basically any desired way. According to a preferred exemplary embodiment of the invention, however, the processing or heating chamber and/or at least one of the processing or heating levels has processing or heating zones arranged in sequence in the direction of transport. A temperature and process parameter distribution which can vary by location practically as desired can thereby be realized in a simple way.

The application of temperatures to the processing or heating chamber and/or the processing or heating levels can occur in any desired way through radiant or convective means, for example through electrical heating elements, gas burners, or the introduction of combustion gases. According to one exemplary embodiment of the invention, each processing or heating level can have at least one separate heating device, with, in addition, each processing or heating zone of each processing or heating level also being able to have a separate heating device. In contrast, it is also possible that at least two processing or heating levels, possibly also all of the processing or heating levels, have at least one joint heating device.

The invention can be realized in the simplest way by locating the processing or heating levels positioned one on top of the other in a uniform processing or heating chamber openly, i.e., essentially without separating walls or similar objects. According to a particularly preferred exemplary embodiment of the invention, however, the processing or heating levels are each implemented as a boxlike processing or heating chamber module which is essentially closed around its transverse circumference and is open on both axial sides. Control of the temperature and the other process parameters which is completely independent of the size of the overall processing and heating chamber, of the workload of the facility, and, connected with this, of the number of the processing or heating chamber modules located on top of one another can thereby be achieved, particularly in the individual processing or heating chamber modules. In addition, a modular design of the facility can thereby be realized which can easily be adjusted to the current capacity requirements. The facility preferably also has a rack-like or framework-like assembly in which the processing or heating chamber modules can be located on top of one another like a stack so that they can be exchanged and are, for example, easily insertable in appropriate holders.

A particularly economical modular design results if, as provided according to one exemplary embodiment of the invention, the transport device is an integral component of the respective processing and heating chamber module. For this purpose, the transport device can, for example, be positioned on the bottom of the respective processing or heating chamber module.

According to a particularly preferred exemplary embodiment of the invention, the facility has an elevator-like lifting device with which the processing or heating chamber modules can be brought into a position in which, in the respective position, they can be inserted into or removed from the rack-like or framework-like assembly. The soldering facility according to the invention can thus be easily and simply adjusted to higher capacity requirements through the addition of individual processing or heating chamber modules, and the reverse.

It is provided according to a further exemplary embodiment, particularly when the facility according to the invention is part of an automated production, that a distributing device is located, at the beginning and/or end of the processing or heating chamber and/or the processing or heating levels, with which the workpieces can alternatively be supplied to the respective processing or heating level and/or be brought to the height of the respective processing or heating level. The distributing device can thereby be controlled manually, sequentially, or with a program.

The distributing device can, according to one exemplary embodiment, essentially be implemented like a paternoster elevator, with the workpieces to be distributed being inserted either by hand or automatically, and then being brought into the respective position by means of endlessly circulating transport bands or chains.

The transfer from the distributing device to the respective transport device of the appropriate processing or heating chamber module can occur directly in basically any desired way. According to a further exemplary embodiment, however, a transfer device is located between the distributing device and the transport device, with which the workpiece can be transferred from the distributing device to the transport device and/or from the transport device to the distributing device.

Each processing or heating level can be implemented with a transport device which extends essentially over the entire width of the processing or heating level. However, at least two transport devices are preferably located next to one another in each processing or heating level.

The transfer device can be implemented as desired, for example as a chain or band conveyor device.

The facility according to the invention can be used basically as desired anywhere thermal treatment of workpieces is required. For this purpose, the facility can particularly be used as a soldering facility, particularly a reflow soldering facility, as a facility for the hardening of plastics or plastic parts, as a facility for the hardening or drying of adhesives or adhesive bonds, and also as a facility for the drying or hardening of lacquers or coatings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
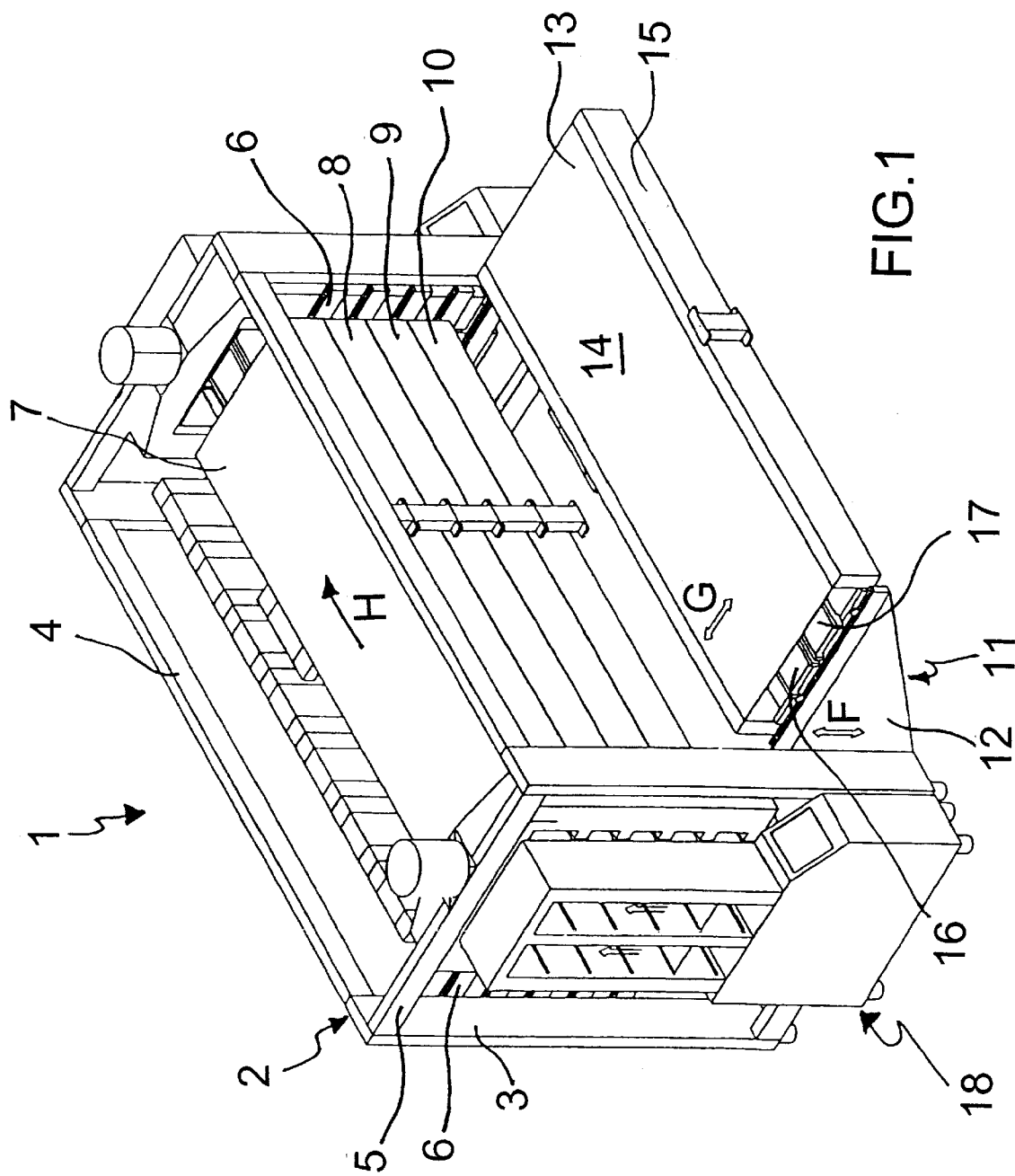
FIG. 1 is in a schematic perspective illustration from the front and to the side showing an exemplary embodiment of a facility according to the invention implemented as a soldering facility.

Referring to the drawings in particular, an exemplary embodiment of a soldering facility 1 according to the invention is illustrated in FIG. 1. The soldering facility 1 has a rack-like or framework-like assembly 2 with vertical supports 3, lengthwise supports 4, and transverse supports 5, which as a whole form a main rack. For reasons of simpler illustration, the housing-like coverings or enclosures of the soldering facility 1 are not illustrated. In the region of both faces, the assembly 2 is internally provided with rail-like holders 6. A total of four processing or heating chamber modules 7, 8, 9, and 10 are inserted and fixed in these rail-like holders 6.

An elevator-like lifting device 11, which has two brackets 12 movable in the direction of the arrow F, is located in the region of the vertical support 3 pointing forward. A further processing or heating chamber module 13, which has the same design as the processing or heating chamber modules 7, 8, 9, and 10, is supported on the brackets 12. The processing or heating chamber module 13 has a boxlike cross-section to which is closed around its transverse circumference and open on both axial sides, each with two side surface pairs 14 and 15. Two transport devices 16 and 17 are positioned next to one another like a chain conveyor in the inner cavity of the processing or heating chamber module 13, as is indicated only schematically. As is obvious from the illustration according to FIG. 1, the processing or heating chamber module 13 can be easily inserted, in the direction of the arrow G, into the framework-like assembly 2 after the lifting device 11 has been brought into the height position shown.

Due to this modular design, it is, for example, possible to position a total of 5 identical processing or heating chamber modules in the assembly 2, with, however, only four of these types of modules being necessary to achieve the desired workload. If one of the modules then breaks down, the module which was previously not needed is then activated, so that no interruption of the operation occurs. The faulty module can, in contrast, be shut down and, also without interrupting the operation, be removed by means of the lifting device for maintenance and repair purposes.

A distributing device 18 is positioned at the entrance of the soldering facility 1 which is essentially implemented like a double paternoster elevator. To charge the soldering facility 1 with the workpieces to be soldered, they are inserted in the distributing device 18 manually or by means of an automatic device, which is not shown, and brought into the respective height position by the distributing device. By means of a transfer device not visible in the figures, the workpieces are removed from the distributing device 18, transferred to the transport devices 16, 17 of the respective processing or heating chamber modules 7 to 10, and conveyed by these transport devices 16, 17 in the direction of the arrow H through the soldering facility 1.

Figure 2:
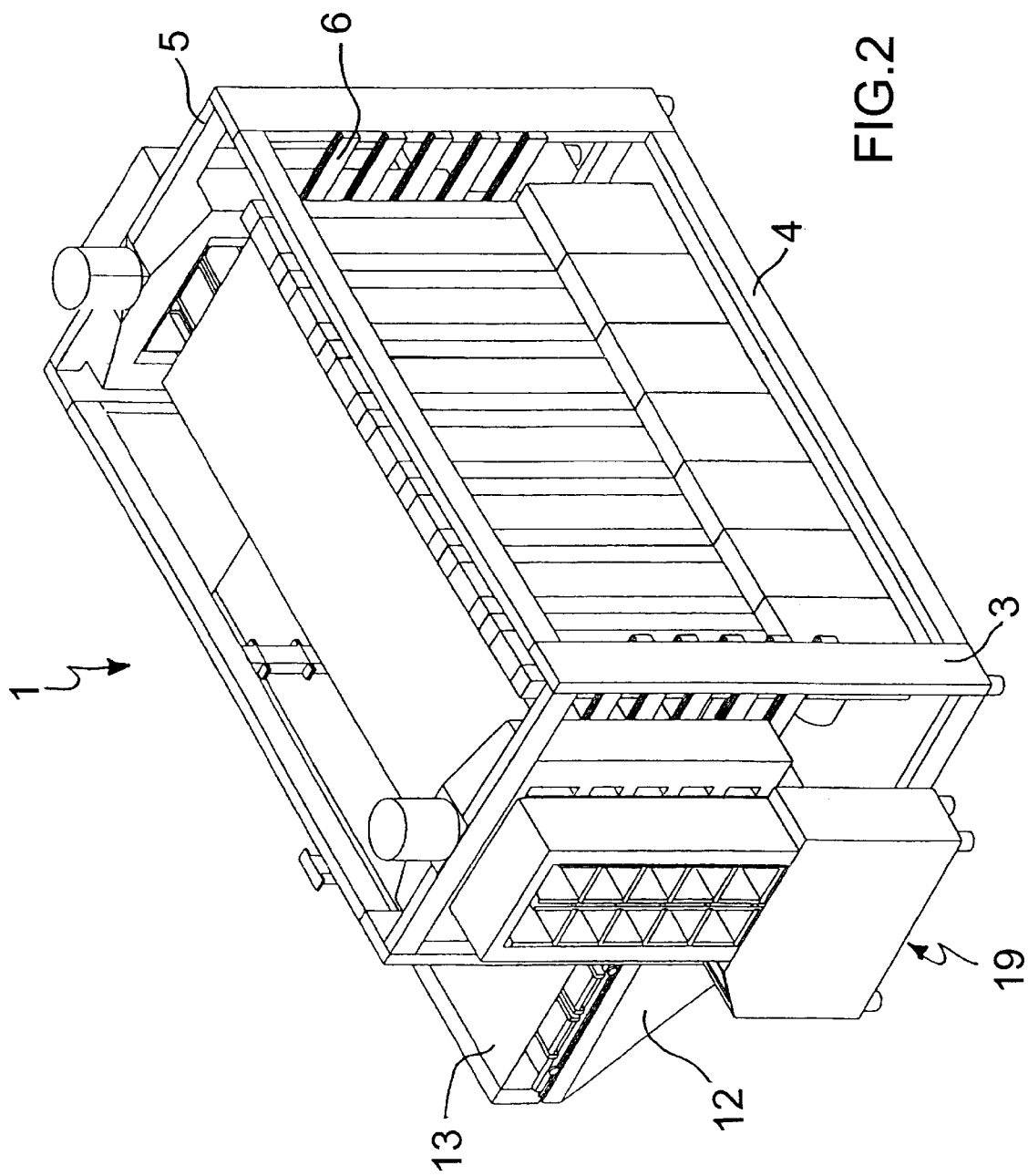
FIG. 2 is also in a schematic perspective illustration, from the rear and to the side the exemplary embodiment according to FIG. 1.

As can be inferred from FIG. 2 particularly, a further distributing device 19, whose design corresponds to the distributing device 18, is positioned at the exit side of the soldering facility 1. The workpieces are thereby transferred from the respective transport device to the distributing device 19 via a transfer device, not shown, and then brought, as if by a paternoster elevator, into a position in which they can be manually or automatically removed.

While specific embodiments of the invention have been shown and described in detail to illustrate the application of the principles of the invention, it will be understood that the invention may be embodied otherwise without departing from such principles.

What is claimed is:

1. A facility for the thermal treatment of workpieces, the facility comprising:
   a procssing or heating chamber with at least two processing or heating levels positioned on top of one another in the processing or heating chamber;
   two separate transport devices, one of said transport devices being a separate transport for one heating level and the other of said transport devices being a separate transport for the other heating level, wherein the processing or heating levels are each implemented as a boxlike processing or heating chamber module which is essentially closed around its circumference and is open on both axial sides.

2. The facility according to claim 1, wherein the processing or heating chamber and/or at least one of the processing or heating levels has processing or heating zones positioned one after another in a direction of transport.

3. The facility according to claim 1, each processing or heating level has at least one separate heating device.

4. The facility according to claim 1, further comprising:
   a rack-like or framework-like assembly in which the processing or heating chamber modules are positioned one on top of the other like a stack so that they can be exchange.

5. The facility according to claim 4, wherein the transport device is an integral component of the respective processing and heating chamber module.

6. The facility according to claim 4, further comprising:
   an elevator-like lifting device with which the processing or heating chamber modules can be brought into a position in which, in the respective position, they can be inserted into or removed from the rack-like or framework-like assembly.

7. The facility according to claim 1, further comprising:
   a distributing device with which the workpieces can be alternately supplied to the respective processing or heating level, said distributing device being located at the entrance and/or exit of the processing or heating chamber and/or the processing or heating levels.

8. The facility according to claim 7, wherein the distributing device is essentially implemented like a paternoster elevator.

9. The facility according to claim 7, further comprising a transfer device for transferring the workpiece from the distributing device to the transport device and/or from the transport device to the distributing device, said transfer device being positioned between the distributing device and the transport device.

10. The facility according to claim 1, wherein at least two transport devices are positioned next to one another in each processing or heating level.

11. The facility according to one of the claim 1, wherein the transport device includes a chain or band conveyor device.

12. A process for the thermal treatment of workpieces, the process comprising the steps of:
    providing a processing or heating chamber with at least two process or heating levels positioned on top of one another in the processing or heating chamber;
    employing two separate transport devices, one of said transport devices being a separate transport for one heating level and the other of said transport devices being a separate transport for the other heating level to move workpieces through the respective processing or heating levels; and
    passing the workpieces through the processing or heating levels to solder or reflow solder.

13. A process for the thermal treatment of workpieces, the process comprising the steps of:
    providing a processing or heating chamber with at least two processing or heating levels positioned on top of one another in the processing or heating chamber;
    employing two separate transport devices, one of said transport devices being a separate transport for one heating level and the other of said transport devices being a separate transport for the other heating level to move workpieces through the respective processing or heating levels; and
    passing the workpieces through the processing or heating levels to dry or harden plastics or adhesves.

14. A facility for the thermal treatment of workpieces, the facility comprising:
    a frame defining a processing chamber space;
    a first processing chamber module which is essentially closed around its circumference and is open on both axial sides, said first processing chamber module being insertable into said frame and being removable from said frame;
    a second processing chamber module which is essentially closed around its circumference and is open on both axial sides, said first processing chamber module being arranged with said second processing chamber module in said processing chamber space, with one processing chamber module positioned on top of another processing chamber module, said second processing chamber module being insertable into said frame and being removable from said frame;
    a first transport device associated with said first processing chamber module for transporting workpieces in an axial direction between said open axial sides;
    a second transport device associated with said second processing chamber module for transporting workpieces in an axial direction between said open axial sides, said second transport device being separate from said first transport device.

15. The facility according to claim 14, further comprising:
    a lifting device lifting a processing module into a position for inserting or removing the processing module from the frame.

16. The facility according to claim 14, further comprising:
    a distributing device for supplying the processing modules with workpieces, said distributing device being located at an axial end of the processing modules.

17. The facility according to claim 16, further comprising a transfer device for transferring the workpiece from the distributing device to the transport device and/or from the transport device to the distributing device, said transfer device being positioned between the distributing device and the transport device.

* * * * *